United States Patent [19]

Takabatake et al.

[11] Patent Number: 5,834,547
[45] Date of Patent: Nov. 10, 1998

[54] MOLDING COMPOUND COMPOSITION, MOLDING COMPOUND CONTAINING THE SAME, AND METHOD FOR PRODUCING THE MOLDING COMPOUND

[75] Inventors: Kouji Takabatake, Minoo; Katsura Hayashi, Takatsuki; Yoshinori Utikoshi, Suita, all of Japan

[73] Assignee: Nippon Shokubai Co., Ltd., Osaka, Japan

[21] Appl. No.: 860,271

[22] PCT Filed: Oct. 28, 1996

[86] PCT No.: PCT/JP96/03156

§ 371 Date: Jun. 17, 1997

§ 102(e) Date: Jun. 17, 1997

[87] PCT Pub. No.: WO97/19136

PCT Pub. Date: May 29, 1997

[30] Foreign Application Priority Data

Nov. 22, 1995 [JP] Japan ................................. 7-304167

[51] Int. Cl.$^6$ ..................................................... C08K 5/09
[52] U.S. Cl. .......................... 524/321; 523/501; 523/504; 523/505; 524/433; 524/436; 524/494; 524/789; 524/601; 524/604; 524/773; 524/779; 524/878
[58] Field of Search ..................................... 524/433, 436, 524/494, 601, 604, 773, 779, 789, 878, 321; 523/504, 505, 501

[56] References Cited

U.S. PATENT DOCUMENTS

| | | | |
|---|---|---|---|
| 4,011,195 | 3/1977 | Self | 521/122 |
| 4,067,845 | 1/1978 | Epel et al. | 525/28 |
| 4,192,791 | 3/1980 | Self | 525/249 |
| 4,251,576 | 2/1981 | Osborn et al. | 428/331 |
| 4,299,927 | 11/1981 | Dombroski | 525/64 |
| 4,347,331 | 8/1982 | Self | 521/119 |
| 5,212,217 | 5/1993 | Yukawa et al. | 523/434 |
| 5,331,041 | 7/1994 | Takayama et al. | 524/555 |
| 5,364,903 | 11/1994 | Takayama et al. | 524/555 |
| 5,382,619 | 1/1995 | Takayama et al. | 524/437 |

FOREIGN PATENT DOCUMENTS

| | | |
|---|---|---|
| 51-63858 A | 6/1976 | Japan . |
| 51-98773 A | 8/1976 | Japan . |
| 51-134742 A | 11/1976 | Japan . |
| 52-38561 A | 3/1977 | Japan . |
| 54-3786 | 2/1979 | Japan . |

OTHER PUBLICATIONS

"Latest Application Technique of SMC and Market View—Centering On Unsaturated Polyester", Chunichisha Co., Ltd. Sep. 1, 1990, pp. 72–74.

Primary Examiner—Judy M. Reddick
Attorney, Agent, or Firm—Kubovcik & Kubovcik

[57] ABSTRACT

A molding compound composition of the present invention comprises a resin composition, for example, unsaturated polyester, a succinic acid derivative, and a thickening agent such as magnesium oxide, and the moisture content thereof is adjusted in a range of from 0.1 to 0.45 percent by weight. A molding compound comprises the molding compound composition and reinforced fibers such as glass fibers, and the moisture content thereof is adjusted to be in a range of from 0.1 percent to 0.4 percent by weight. As shown in FIG. 1, the molding compound composition has excellent viscosity characteristics since the initial thickening action due to the thickering agent is restrained. Although the viscosity after thickened is lower than that of a conventional composition, the stickiness of the surface of the molding compound composition is reduced. The molding compound composition has high flowability and excellent impregnability, shows an abrupt viscosity increase after impregnation, and is thickened at higher speeds as compared with the conventional composition.

9 Claims, 4 Drawing Sheets

MOLDING COMPOUND COMPOSITION, MOLDING COMPOUND CONTAINING THE SAME, AND METHOD FOR PRODUCING THE MOLDING COMPOUND

TECHNICAL FIELD

The present invention relates to a molding compound composition particularly suitable for low pressure molding, a molding compound containing the same, and a method for producing the molding compound.

BACKGROUND ART

A sheet molding compound (hereinafter referred to as the "SMC"), bulk molding compound (hereinafter referred to as the "BMC") are known conventional molding compounds. These materials are formed by impregnating reinforced fibers (reinforcements) such as glass fibers with a compound containing unsaturated polyester and various fillers. Immediately after adding a thickening agent such as magnesium oxide to the compound (i.e., when the compound is still low in viscosity), the compound is impregnated into the reinforced fibers, and thickened (matured) to a predetermined viscosity (about several hundred thousand poise). As a result, a molding compound is produced.

However, the initial thickening action of the above-mentioned thickening agent on the compound is great. Namely, since the initial increase in the viscosity is rapid, the time during which the compound can retain low viscosity, i.e., the time during which the compound can be impregnated into the reinforced fibers, is short after the preparation of the compound. Moreover, the above-mentioned thickening agent takes a long time to thicken the compound to a viscosity suitable for use as the SMC or BMC. Thus, the conventional molding compounds have problems that the processability in production thereof is bad, and a long time is required for the maturation thereof.

In general, molding compounds capable of being molded at low pressure have been demanded so as to reduce the molding pressure. Further, in production of such a molding compound, in order to increase the flowability, attempts to lower the viscosity of the thickened compound by reducing the amount of the thickening agent have been made. However, when the amount of the thickening agent is reduced, the surface of the resultant molding compound becomes sticky, and so-called handling characteristics in molding the molding compound are worsened. In particular, in the case of SMC, the releasability in removing a film used in production of the SMC from the surface of the SMC is worsened. On the other hand, when the amount of the thickening agent is increased, it is possible to reduce the stickiness on the surface of the resultant molding compound. In this case, although the SMC has good film releasability, the viscosity of the thickened compound becomes excessively high for low pressure molding. Therefore, when the molding compound is molded at low pressure (around 1 MPa), defects such as nonfill (unsatisfactory filling) occur due to the low flowability of the compound. It is thus impossible to produce a molding compound that is particularly suitable for low pressure molding by only adjusting the amount of the thickening agent.

Furthermore, it is known that the thickening action of the thickening agent and the viscosity of the thickened compound depend greatly on the moisture content of the compound (see, for example, "Latest Application Technique of SMC and Market view -Centering on Unsaturated Polyester", [1–7 Moisture] Section, pages 72–74, Chunichisha CO. LTD., Sep. 1, 1990). More specifically, when a uniform amount of the thickening agent is used for the compound, if the moisture content of the compound is great, the initial thickening rate becomes higher. Consequently, the flowability of the compound is lowered, and poor impregnation will result. In addition, since the viscosity of the thickened compound is further lowered, the production of the molding compound becomes difficult. On the contrary, when the moisture content of the compound is small, the initial thickening rate becomes lower, and the viscosity after thickened becomes higher.

Accordingly, when producing the conventional molding compound, it is necessary to adjust the working environment, for example, adjust the humidity to reduce the moisture content of the compound as small as possible, so that the molding compound has improved processability and uniform quality. More specifically, when producing the conventional molding compound, it is necessary to adjust the working environment so as to control the moisture content of the compound to be less than 0.1 percent by weight. Additionally, it is necessary to dry a filler and the like to be used for producing the molding compound in advance. Namely, the processing steps are complicated.

In order to solve the above problems associated with conventional molding compounds, it is an objective of the present invention to provide a molding compound composition that has good processability in production of the molding compound, good handling characteristics and moldability, and is particularly suitable for low pressure molding; a molding compound containing the molding compound composition; and a method for producing the molding compound.

DISCLOSURE OF THE INVENTION

In order to achieve the above objective, the present inventors eagerly searched for a molding compound composition that has good processability, handling characteristics and moldability and is particularly suitable for low pressure molding; a molding compound containing the molding compound composition; and a method for producing the molding compound. As a result, it was found that a molding compound composition containing a resin composition, succinic acid derivative, thickening agent, and an amount of water ranging from 0.1 percent to 0.45 percent by weight has excellent viscosity characteristics since the initial thickening action due to the thickening agent is restrained. It was also found that the molding compound composition has reduced surface stickiness and good handling (characteristics though the viscosity thereof after thickening is lower than that of a conventional composition. More specifically, it was found that the above-mentioned molding compound composition can keep a low viscosity state for about 30 minutes after the preparation, has high flowability and excellent impregnability into a reinforcement, shows an abrupt viscosity increase about 60 minutes later from the preparation, and is thickened at higher speeds compared to the conventional composition. It was found that a molding compound obtained by impregnating the reinforcement with the molding compound composition is particularly suitable for molding under low pressure (about 1 MPa). In addition, it was found that a molding compound whose moisture content is in a range of from 0.1 percent to 0.4 percent by weight can fully exhibit the above-mentioned functions and effects. The present invention was completed based upon the above findings.

Namely, in order to achieve the above objectives, the molding compound composition of the present invention is characterized by containing a resin composition, succinic acid derivative, thickening agent, and an amount of water ranging from 0.1 percent to 0.45 percent by weight.

The molding compound of the present invention is characterized by including a molding compound composition containing a resin composition, succinic acid derivative and thickening agent, a reinforcement, and an amount of water ranging from 0.1 percent to 0.4 percent by weight.

In this structure, since the above-mentioned various functions and effects can be exhibited, it is possible to provide a molding compound that has good processability in production thereof, good handling characteristics and moldability in molding the molding compound, and is particularly suitable for low pressure molding.

A method for producing a molding compound of the present invention is characterized by impregnating a reinforcement with a molding compound composition containing a resin composition, succinic acid derivative, thickening agent, and an amount of water ranging from 0.1 percent to 0.45 percent by weight.

In this structure, since the above-mentioned various functions and effects can be exhibited, it is possible to easily produce a molding compound that has good processability, handling characteristics and moldability, and is particularly suitable for low pressure molding.

The following description will discuss the present invention in detail.

A molding compound of the present invention contains reinforced fibers (reinforcement) of a length not shorter than ⅛ inches, for example, glass fibers, and a molding compound composition containing a resin composition, succinic acid derivative, thickening agent, water and, if necessary, filler, initiator, additives, pigment and so on. For example, the molding compound is suitably used as a sheet molding compound (SMC) or a bulk molding compound (BMC).

Although the above-mentioned resin composition is not particularly limited as long as it is a composition suitable for, for example, SMC or BMC, a mixture of unsaturated polyester and vinyl monomer is particularly suitable. Moreover, the resin composition may contain a low profile additive, if necessary. The above-mentioned mixture can be easily prepared.

Although the unsaturated polyester is not particularly limited, a resin having a number average molecular weight (Mn) in a range of from 1,000 to 6,000, an acid value in a range of from 9 mgKOH/g to 50 mgKOH/g, a hydroxyl value in a range of from 10 mgKOH/g to 60 mgKOH/g is preferred. Such an unsaturated polyester is easily obtained by performing a dehydration reaction (condensation reaction) of polyhydric alcohol and $\alpha$, $\beta$-unsaturated dibasic acid, and, if necessary, saturated dibasic acid, under the atmosphere of inert gas such as carbonate gas and nitrogen gas at a temperature ranging from 140° C. to 250° C. In this case, the method of synthesizing the unsaturated polyester is not particularly limited.

In the present invention, the acid value indicates the amount (mg) of potassium hydroxide required for neutralizing 1 g of unsaturated polyester. The hydroxyl value indicates the amount (mg) of potassium hydroxide of the same mole (equivalent weight) as the hydroxy group contained in 1 g of unsaturated polyester.

Examples of the $\alpha$, $\beta$-unsaturated dibasic acid are maleic acid, maleic anhydride, fumaric: acid, and halogenated maleic anhydride. It is possible to use only one kind of the above-mentioned $\alpha$, $\beta$-unsaturated dibasic acids or any combination thereof.

Examples of the saturated dibasic acid include phthalic acid, phthalic anhydride, isophthalic acid, terephthalic acid, tetrahydrophthalic anhydride, halogenated phthalic anhydride, succinic acid, adipic acid, and sebacic acid. It is possible to use only one kind of these saturated dibasic acids or any combination thereof. In the case of using a saturated dibasic acid, the amount of the saturated dibasic acid to be mixed with the $\alpha$, $\beta$-unsaturated dibasic acid is not particularly limited.

Examples of the polyhydric alcohol include ethylene glycol, diethylene glycol, triethylene glycol, propylene glycol, dipropylene glycol, 1,3-butylene glycol, 1,4-butylene glycol, neopentyl glycol, hydrogenated bisphenol A, 1,6-hexanediol, adduct of bisphenol A and propylene oxide or ethylene oxide, propylene oxide, ethylene oxide, glycerin, and trimethylolpropane. It is possible to use only one kind of these polyhydric alcohols or any, combination thereof. The amount of polyhydric alcohol used for 1.00 mole of the $\alpha$, $\beta$-unsaturated dibasic acid varies depending on the combination of these compounds, but is preferably in a range of from about 0.90 moles to about 1.10 moles.

Examples of the vinyl monomer are styrene, vinyl toluene, chlorostyrene, vinyl acetate, $\alpha$-methyl styrene, diallyl phthalate, and (meth acrylic alkyl ester. It is possible to use only one kind of these vinyl monomers or any combination thereof.

The mixing ratio of the unsaturated polyester to the vinyl monomer in the above-mentioned resin composition is not particularly limited. However, it is preferred that the unsaturated polyester is in a range of from 70 parts to 30 parts by weight and the vinyl monomer is in a range of from 30 parts to 70 parts by weight when the total amount of these compounds is 100 parts by weight.

The low profile additive is not particularly limited, and examples thereof include polyethylene, polystyrene, polyvinyl acetate, poly(meth)acrylate, polybutadiene, hydrogenated polybutadiene, and saturated polyester. The amount of the low profile additive is not particularly limited.

The filler is not particularly limited, and fillers that are generally used for a resin composition, i.e., resins such as unsaturated polyester, may be used. Examples of such a filler are calcium carbonate, barium sulfate, clay, talc, aluminum trihydroxide, alumina, silica sand, river sand, diatomaceous earth, powdered mica, gypsum, white marble, powdered asbestos, and hollow ceramics. Although the amount of the filler to be used varies depending on the kind or combination thereof, it is preferably in a range of from 20 parts to 600 parts by weight based on 100 parts by weight of the resin composition. It is possible to use other fillers such as powdered glass, short reinforced fibers of a length shorter than ⅛ inches, for example, short glass fibers, polyvinylidene chloride, and Shirasu (volcanic ash) together with the above-mentioned fillers in an amount ranging from 3 parts to 100 parts by weight based on 100 parts by weight of the resin composition. In short, the filler is used within a range in which it does not deteriorate required characteristics, i.e., various physical properties, of a molding compound to be produced. For instance, the filler is used as the need arises to refine the processability, and improve the performance quality.

As the initiator (polymerization initiator), initiators that are generally used for raisins such as unsaturated polyester may by employed. Examples of such an initiator include organic peroxides, such as benzoyl peroxide, methyl ethyl ketone peroxide, t-butyl peroxy benzoate, t-butyl peroxy octoate, dicumyl peroxide, cumene hydroperoxide, cyclohexanone peroxide, and lauroyl peroxide; and radical polymerization initiators, such as 2,2'-azobisisobutyronitrile, and azobisvaleronitrile. However, the initiator is not necessarily limited to those mentioned above. It is possible to use only one kind of the initiators or any combination thereof. The amount of the initiator to be used varies depending on the kind or combination thereof, but is preferably within a range of from 0.1 part to 5 parts by weight based on 100 parts by weight of the resin composition.

In order to improve the stability of the resin composition, the molding compound composition may contain an inhibitor (polymerization inhibitor), if necessary. Examples of the stabilizer are hydroquinone, t-butyl hydroquinone, catechol, t-butyl catechol, p-methoxy phenol, butylate hydroxy anisole, benzoquinone, and t-butyl benzoquinone. It is possible to use only one kind of these stabilizers or any combination thereof. The amount of the stabilizer to be used is not particularly limited, but is preferably, for example, within a range of from 0.001 part to 0.5 part by weight based on 100 parts by weight of the resin composition.

Moreover, the above-mentioned molding compound composition may contain various additives, if necessary. Additives that are generally used for resins such as unsaturated polyester may be used. As the additives, for example, (internal) mold release agent, defoaming agent, wetting agent, and coupling agent may be used. Examples of the mold release agent include organic acids such as stearic arid, and metal salts thereof; and common wax or silicone-based mold release agents. The amount of additives to be added is determined depending on the kind or combination thereof. For example, it is preferred to add the mold release agent in an amount ranging from 0.1 parts to 10 parts by weight based on 100 parts by weight of the resin composition.

As the succinic acid derivative, for example, compounds having 8 to 30 carbons in total are preferred. Succinic acid derivatives having not more than 7 carbons in total are not preferred because these derivatives have poor solubility in the resin composition. On the other hand, succinic acid derivatives having not less than 31 carbons in total have good solubility, but have an excessive molecular weight. Therefore, there is a need to use a large amount of the succinic acid derivative having not less than 31 carbons in total. Namely, such a succinic acid derivative also is not preferred. Preferred succinic acid derivatives are, for example, octyl succinic acid, octenyl succinic acid, hexyl succinic acid, hexycenyl succinic acid, nonyl succinic acid, nonenyl succinic acid, decyl succinic acid, decenyl succinic acid, dodecyl succinic acid, dodecenyl succinic acid, tetradecyl succinic acid, tetradecenyl succinic acid, cyclododecyl succinic acid, cyclododecenyl succinic acid, hexadecyl succinic acid, hexadecenyl succinic acid, heptadecyl succinic acid, heptadecenyl succinic acid, octadecyl succinic acid, octadecenyl succinic acid, eicocyl succinic acid, eicocenyl succinic acid, diphenyl butanyl succinic acid, pentadodecyl succinic acid, pentadodecenyl succinic acid, and salts thereof. It is possible to use only one of the succinic acid derivatives or any combination thereof. The method of synthesizing the succinic acid derivative is not particularly limited.

The amount of the succinic acid derivative to be used varies depending on the kind or combination thereof, but is preferably in a range of from 0.01 part to 10 parts by weight, and more preferably in a range of from 1 part to 10 parts by weight based on 100 parts by weight of the resin composition. When the amount of the succinic acid derivative is less than 0.01 part by weight, the functions and effects that are to be produced by the use of the succinic acid derivative are lessened. More specifically, the initial viscosity of the molding compound composition becomes excessively high, and the molding compound composition cannot be sufficiently impregnated into reinforced fibers. Thus, the use of the succinic acid derivative in an amount less than 0.01 part by weight is not preferred. On the other hand, when the amount of the succinic acid derivative exceeds 10 parts by weight, it is possible to restrain the initial viscosity of the molding compound composition at low values. However, the physical properties such as hot water resistance are lowered. Therefore, the use of the succinic acid derivative in an amount exceeding 10 parts by weight is not preferred.

Although the method of adding the filler, initiator, additives and succinic acid derivative to the resin composition, i.e., the method of preparing the molding compound composition, is not particularly limited, it is preferred to add the filler after adding the succinic acid derivative, initiator and additives to the resin composition.

The amount of water is determined so that the molding compound composition contains water in an amount ranging from 0.1 percent to 0.45 percent by weight, more preferably from 0.12 percent to 0.42 percent by weight, and most preferably from 0.15 percent to 0.4 percent by weight. Namely, the moisture content of the molding compound composition is in a range of preferably from 0.1 percent to 0.45 percent by weight, more preferably from 0.12 percent to 0.42 percent by weight, and most preferably from 0.15 percent to 0.4 percent by weight. When the moisture content is less than 0.1 percent by weight, it is possible to restrain the initial viscosity of the molding compound composition at low values. However, when the viscosity after thickening is set to relatively low values, the surface of the molding compound composition becomes sticky. Therefore, a moisture content of less than 0.1 percent by weight is not preferred. On the other hand, when the moisture content exceeds 0.45 percent by weight, the initial viscosity of the molding compound composition becomes excessively high, and the molding compound composition cannot be sufficiently impregnated into the reinforced fibers. Thus, a moisture content exceeding 0.45 percent by weight is not preferred. Namely, when the moisture content is out of the above mentioned range, a molding compound composition having good thickening characteristics is not obtained. Accordingly, a moisture content out of the above-mentioned range is not preferred. The method of adding water to the molding compound composition is not particularly limited.

The thickening agent is not particularly limited, and examples thereof include: alkaline earth metal oxides, such as magnesium oxide, and calcium oxide; and alkaline earth metal hydroxides, such as magnesium hydroxide and calcium hydroxide. It is possible to use only one kind of the thickening agents or any combination thereof. The amount of the thickening agent to be used varies depending on the kind or combination thereof, but is preferably in a range of from 0.2 part to 5 parts by weight based on 100 parts by weight of the resin composition. When the amount of the thickening agent is less than 0.2 part by weight, the viscosity of the thickened molding compound composition does not reach a desired value. Thus, the use of the thickening agent in an amount less than 0.2 part by weight is not preferred. On the other hand, when the amount of the thickening agent is more than 5 parts by weight, the initial viscosity of the molding compound composition becomes excessively high, and the molding compound composition cannot be sufficiently impregnated into the reinforced fibers. Therefore, the use of the thickening agent in an amount more than 5 parts by weight is not preferred. Moreover, since the resultant molding compound is too hard, a molded article of good quality cannot be obtained by molding such a molding compound. In short, when the amount of the thickening agent is out of the above-mentioned range, a molding compound composition having good thickening characteristics is not obtained. Thus, it is not preferred to use the thickening agent in an amount out of the above-mentioned range.

As the pigment, inorganic pigments and organic pigments that are generally used for resins such as unsaturated polyester may be used. The amount of the pigment is not particularly limited. However, it is preferred to mix the pigment in an amount ranging from 0.5 part to 20 parts by weight based on 100 parts by weight of the resin composition.

The method of adding the thickening agent, pigment, water, etc. to the resin composition, i.e., the method of preparing the molding compound composition, is not particularly limited.

The above-mentioned molding compound composition has good thickening characteristics. The viscosity of the molding compound composition increase, to draw a logistic curve shaped like the letter S. More specifically, the viscosity (initial viscosity) of the molding compound composition keeps low values for about 30 to 60 minutes after the preparation of the molding compound composition. When several hours have elapsed since the preparation of the molding compound composition, a sudden increase in the viscosity (thickening) occurs. This marks a rise of the curve in the logistic curve, i.e., a rise of the viscosity. When the viscosity after thickened reaches a suitable value, this value is retained. For example, the initial viscosity of the molding compound composition in a period of about 30 minutes from the preparation thereof is in a range of from around 50 poise to around 500 poise. For instance, the viscosity of the molding compound composition that has been thickened (matured) for 24 hours at 40° C., i.e., the viscosity indicating a limiting value of the logistic curve (limiting viscosity), is in a range of from around 50,000 poise to around 500,000 poise, more preferably from around 100,000 poise to around 400,000 poise.

Thus, since the initial viscosity is kept at low values, the molding compound composition has high flowability and can be sufficiently and uniformly impregnated into the reinforced fibers. Moreover, the molding compound composition has reduced stickiness on the surface thereof and good handling characteristics though its viscosity after thickening is lower than that of a conventional composition.

The reinforced fibers are not particularly restricted as long as they are fibers having a length of not shorter than ⅛ inches. Preferred examples include glass fibers. Examples of the glass fibers are chopped strand obtained by cutting a glass roving, and chopped strand mat produced by layering chopped strands at random in the form of a sheet. The thickness (diameter) of the reinforced fiber is not particularly limited. The ratio of the reinforced fibers to the molding compound composition, i.e., the amount of the reinforced fibers contained in the molding compound, is not restricted, and may be determined according to the mechanical properties and other properties required for a molded article to be produced by molding the molding compound.

By impregnating the reinforced fibers with the molding compound composition, it is possible to obtain a molding compound whose moisture content is in a range of from 0.1 percent to 0.4 percent by weight, more preferably from 0.12 percent to 0.38 percent by weight, and most preferably from 0.15 percent to 0.35 percent by weight. Referring now to FIG. 4, the following description will discuss a method for producing a molding compound by taking a method for producing the SMC as an example. First, an SMC manufacturing machine will be explained. The structure of the SMC manufacturing machine is not necessarily limited to the one shown in FIG. 4.

As illustrated in FIG. 4, the SMC manufacturing machine includes film feeders 1 for supplying a pair of upper and lower films 1a and 1b, a resin feeder (not shown) for supplying a molding compound composition 2, knife coaters 10 for applying the molding compound composition 2 in a predetermined thickness on the surfaces of the films 1a and 1b, an endless belt conveyer 3 for transporting the lower film 1a, drive rollers 3a for driving the belt conveyer 3, supporting rollers 7 for supporting the belt conveyer 3, a cutter 5 for cutting a glass roving 6 as reinforced fibers (reinforcement) into a predetermined length, an endless belt conveyer 4 for transporting the upper film 1b while pressing the film 1b toward the film 1a, drive rollers 4a for driving the belt conveyer 4, defoaming rollers 8 for eliminating bubbles in an SMC 20 before thickening by pressing the belt conveyer 4, and a wind-up roller 9 for winding up the SMC 20 before thickening.

The film feeders 1 include feed rollers 1c for pulling and feeding the rolled films 1a and 1b, and tension rollers 1d for keeping the tension of the films 1a and 1b at a uniform level. The films 1a and 1b are made of synthetic resins, for example, polyethylene and polypropylene, that are not mixed with the molding compound composition 2 and separable from the molding compound composition 2, i.e., from the SMC surface.

The molding compound composition 2 is in the form of liquid or paste. The resin feeder (not shown) has a tank for storing the molding compound composition 2, and feeds a predetermined amount of the molding compound composition 2 per unit time to the surfaces of the films 1a and 1b. The knife coaters 10 continuously apply the molding compound composition 2 to the surfaces of the films 1a and 1b in a thickness corresponding to a desired thickness of SMC.

The drive rollers 3a are rotated in the clockwise direction in FIG. 4. Therefore, the lower film 1a placed on the belt conveyer 3 is transported toward the right (i.e., toward the wind-up roller 9) in FIG. 4.

The cutter 5 includes a cutter roller 5a having a plurality of cutters attached thereto, and a rubber roller 5b. The cutter roller 5a is rotated in the clockwise direction in FIG. 4. On the other hand, the rubber roller 5b is rotated in a direction opposite to the rotating direction of the cutter roller 5a, i.e., in the counterclockwise direction. In the cutter 5, the glass roving 6 supplied by a glass roving feeder (not shown) is sandwiched between the cutter roller 5a and the rubber roller 5b, and is pressed to cut. Thus, the cutter 5 continuously cuts the glass roving 6 into a predetermined length so as to produce the glass fibers 6a.

The drive rollers 4a are rotated in a direction opposite to the rotating direction of the drive rollers 3a, i.e., in the counterclockwise direction. Therefore, in FIG. 4, the belt conveyer 4 is rotated in a direction opposite to the rotating direction of the belt conveyer 3, i.e., in the counterclockwise direction. The distance between the belt conveyers 3 and 4 are adjusted to form a space corresponding to the desired thickness of the SMC. When the belt conveyer 4 is pressed downward in FIG. 4 (i.e., toward the belt conveyer 3) by the defoaming rollers 8, the SMC 20 before thickening is pressed, the glass fibers 6a are impregnated with the molding compound composition 2, and the bubbles in the SMC 20 before thickening are eliminated (defoamed).

Next, a method for producing the SMC using the SMC manufacturing machine of the above-mentioned structure will be explained. It should be noted that it is preferred to produce the SMC at working atmosphere with controlled moisture so as to make the moisture content of the SMC uniform.

First, with the use of the knife coater 10, the molding compound composition 2 supplied by the resin feeder (not shown) is continuously applied in a predetermined thickness to the surface of the lower film 1a transported by the belt conveyer 3. Subsequently, the glass roving 6 supplied by the glass roving feeder (not shown) is continuously cut into the glass fibers 6a by the cutter 5. The glass fibers 6a are dropped and uniformly applied to the surface of the molding compound composition 2.

Similarly, with the use of the knife coater 10, the molding compound composition 2 supplied by the resin feeder is continuously applied in a predetermined thickness to the surface of the upper film 1b supplied by the film feeder 1.

Subsequently, the films 1a and 1b, i.e., the lower molding compound composition having the glass fibers 6a applied thereto and the upper molding compound composition 2, are placed one upon another to form the SMC 20 before thickening. Thereafter, the SMC 20 before thickening that is transported by the belt conveyer 3 is pressed downward by the defoaming rollers 8 through the belt conveyer 4 so as to impregnate the glass fibers 6a with the molding compound composition 2 and eliminate (defoam) the bubbles. Since the molding compound composition 2 has high flowability, impregnation and defoaming can be easily performed. Then, the SMC 20 before thickening is wound up by the wind-up roller 9.

The SMC 20 before thickening are folded in sheet form of a predetermined size or packed as in roll form using, for example, a packaging film, and thickened (matured) by a predetermined method.

The SMC as the molding compound is produced through the above-mentioned processing steps. When producing a molded article using the SMC obtained through the above-mentioned processing steps, a known fabrication method may be employed. More specifically, first, the SMC sheet is cut into a size smaller than a cavity of a mold used for producing the molded article. Next, after separating the films 1a and 1b from the surface of the SMC, the SMC is charged in the mold. Since the surface of the SMC is not sticky, the films 1a and 1b can be easily separated from the SMC. Subsequently, after clamping the mold, the SMC is molded by heat and pressure under predetermined conditions, for example, by a pressure of 1 MPa and at a temperature ranging from 120° C. to 150° C. As a result, a desired molded article is produced. The molded article is not particularly restricted, and may be formed as, for example, decorative building materials like tiles and wall panels; housing equipment including bathtubs, panels used for bathroom, kitchen counters, washbasins, and top panels for table; and other various decorative items.

As described above, the molding compound composition of the present invention contains a resin composition, succinic acid derivative, thickening agent, and an amount of water ranging from 0.1 percent to 0.45 percent by weight. The molding compound of the present invention contains the molding compound composition, a reinforcement, and an amount of water ranging from 0.1 percent to 0.4 percent by weight.

The molding compound composition has excellent viscosity characteristics since the initial thickening action due to the thickening agent is restrained. Moreover, the molding compound composition has reduced stickiness on the surface thereof and good handling characteristics even though its viscosity after thickening is lower than the viscosity of a thickened conventional composition. Namely, the above-mentioned molding compound composition has high flowability and excellent impregnability into the reinforced fibers, shows an abrupt increase of the viscosity after impregnated, and is thickened in a shorter time compared to the conventional composition. It is therefore possible to provide a molding compound that has good processability in production thereof, good handling characteristics and moldability in molding the molding compound, and is particularly suitable for low pressure molding.

The molding compound of the present invention is particularly suitable for molding performed at low pressure (around 1 MPa). This molding compound is also suitable for molding performed under conventional molding conditions, i.e., by high pressure (around 5 MPa to 15 MPa).

As described above, the method for producing the molding compound of the present invention includes the step of impregnating a reinforcement with a molding compound composition containing a resin composition, succinic acid derivative, thickening agent, and an amount of water ranging from 0.1 percent to 0.45 percent by weight. With this method, it is possible to easily produce a molding compound which has good processability in production thereof, good handling characteristics and moldability in molding the molding compound, and is particularly suitable for low pressure molding.

For a fuller understanding of the nature and advantages of the invention, reference should be made to the ensuing detailed description taken in conjunction with the accompanying drawings.

BEST MODE FOR CARRYING OUT THE INVENTION

Figure 1:
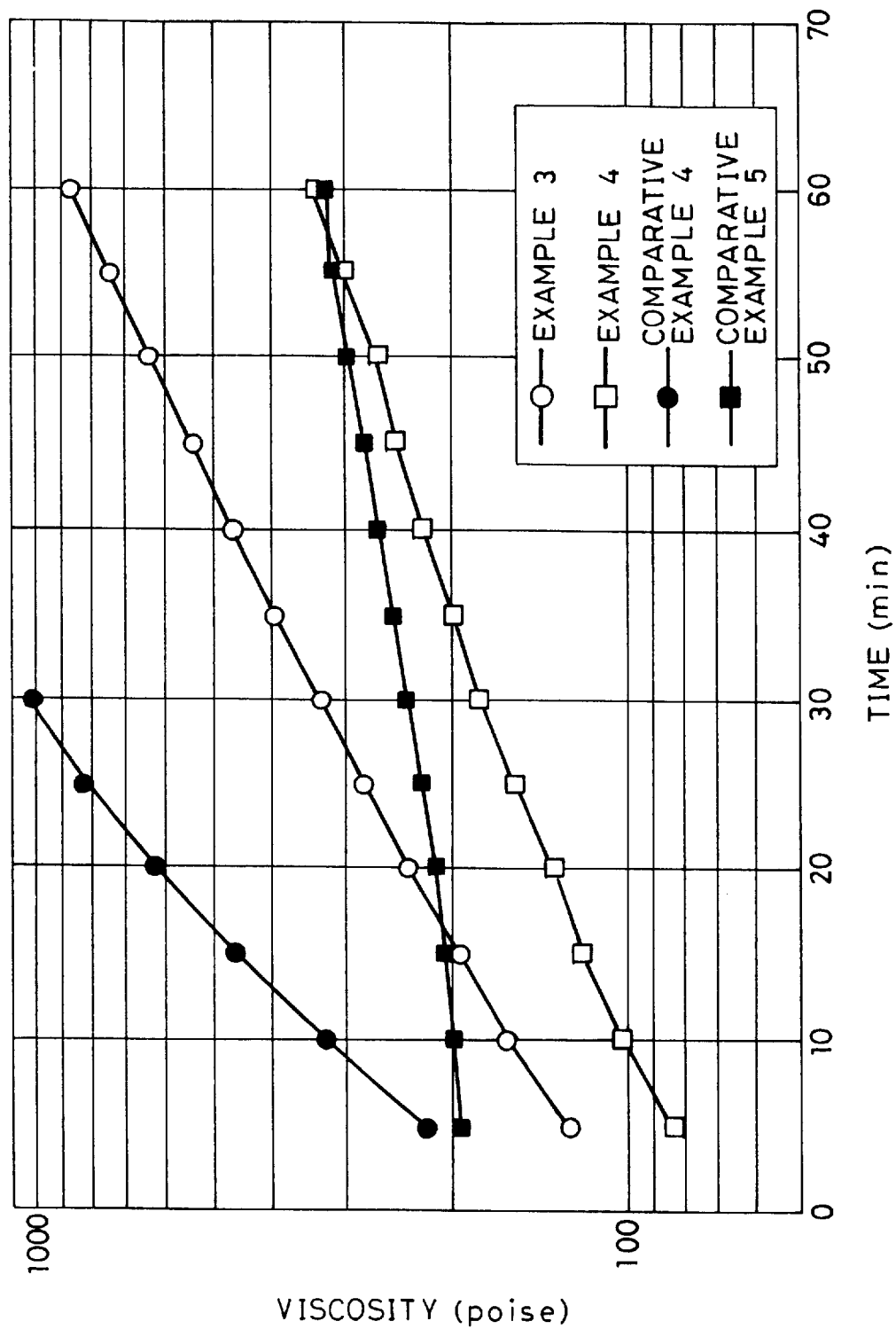
FIG. 1 is a graph (semi-log graph) showing the results of measuring the initial viscosity of molding compound compositions used for a molding compound of the present invention, and comparative examples.

The following description will explain the present invention in greater detail by presenting examples and comparative examples. It should be noted that these examples and comparative examples are presented for the purpose of illustration only and are not to be construed as limiting the scope of the invention in any way.

The moisture content of the molding compound composition and SMC (molding compound), and the viscosity of the thickened molding compound composition were measured by the method explained below. The terms "part" and "percent" mentioned in the examples and comparative examples mean "part by weight" and "percent by weight", respectively.

(a) Moisture Contents of Molding compound Composition and Molding compound

The moisture content (%) of the molding compound composition, and the moisture content (%) of the SMC as a molding compound were measured by a moisture evaporator (ADP-351 available from Kyoto Electronics Manufacturing CO., LTD.) and a Karl-Fischer Moisture Titrator (MKA-210 of the same company) which are connected to each other. A solution was formed by mixing styrene and methanol from which moisture was removed in a ratio of 2:1 (styrenne:methanol) by volume, and charged as a solvent into a titration cell of the moisture meter.

More specifically, a predetermined amount of the molding compound composition (or SMC) was charged as a sample into a heat cell of the moisture evaporator, and then heated to 180° C. to vaporize moisture. Next, the vaporized moisture (moisture vapor) was supplied to the titration cell of the moisture meter using a dry nitrogen gas as a carrier gas, and the moisture content of the sample was titrated.

After the measurement, the heat cell of the moisture evaporator and the titration cell of the moisture titrator were sufficiently substituted using the dry nitrogen gas, and aging was performed until the background entered into a stable state. After the background became stable, titration was performed without charging the sample so as to obtain a blank. The moisture content (%) of the molding compound composition (or SMC) was given by subtracting the blank from the average value of the measurements.

(b) Viscosity of Thickened Molding compound Composition

The viscosity (poise) of the thickened molding compound composition was measured by a viscometer with Helipath stand (available from Brookfield Engineering Laboratories, INC.) using a T-bar spindle at 40° C. under predetermined conditions. Namely, the values given as the viscosity in the examples and comparative examples indicate the viscosity at 40° C.

Example 1

After charging 882 parts maleic anhydride as α, β-unsaturated dibasic acid, 148 parts phthalic anhydride as saturated dibasic acid, and 798 parts propylene glycol as polyhydric alcohol into a four-necked flask as a reactor including a thermometer, a nitrogen gas inlet tube and an agitator, the air in the flask was substituted with a nitrogen gas. Subsequently, the flask was heated to a maximum temperature of 220° C. while agitating the mixture, and dehydration was performed for a predetermined period of time. As a result, unsaturated polyester with a number average molecular weight (Mn) of 2,439, an acid value of 21, and a hydroxyl value of 25 was obtained. By mixing 60 parts unsaturated polyester, 40 parts styrene as a vinyl monomer and 0.02 parts hydroquinone as a stabilizer, a resin composition A was produced.

On the other hand, by mixing 70 parts styrene as vinyl monomer, 30 parts polystyrene as a low profile additive (resin composition) and 0.02 parts hydroquinone as a stabilizer, a resin composition B was obtained.

Next, 80 parts resin composition A was mixed with 20 parts resin composition B, 150 parts calcium carbonate as a filler, 1.0 part t-butyl-peroxy benzoate as an initiator, 3 parts zinc stearate as a mold releasing agent, and 1.5 parts pentadodecenyl succinic acid as a succinic acid derivative. Further, by mixing 0.6 part magnesium oxide as a thickening agent and 5 parts titanium oxide as a pigment with the mixture, and by adding water to control the moisture content of a desired molding compound composition to be 0.12 percent, the molding compound composition was prepared. Namely, the molding compound composition with a moisture content of 0.12 percent was prepared.

With the use of the molding compound composition, an SMC before thickening was produced by the above-mentioned production method. More specifically, the molding compound composition and a glass roving were supplied to the SMC manufacturing machine within 30 minutes from the preparation of the molding compound composition. Thereafter, the cutting rate of the glass roving was adjusted so that the ratio of glass fibers to the molding compound composition in tee resultant SMC was 40 parts to 100 parts, and the SMC before thickening was produced. In this case, polyethylene films were used as a pair of upper and lower films.

The viscosity of the molding compound composition was kept low during the production of the SMC before thickening by the SMC manufacturing machine. Consequently, the molding compound composition showed excellent impregnability into the glass fibers. After the production of the SMC, the viscosity abruptly increased. The viscosity of the molding compound composition in the SMC reached a predetermined value (about 300,000 poise) suitable for a molding compound after the passage of 24 hours at 40° C. Thus, the processability in production of the SMC was good. Moreover, the viscosity of the molding compound composition did not change much and was retained at a substantially constant value even after 10 days from the preparation.

The polyethylene films were easily separated from the SMC produced by the above-mentioned method. In addition, it was found by touching the SMC with a hand that the surface was not sticky. Thus, the so-called handling characteristics of the SMC were good.

Next, the moldability of the SMC was assessed. More specifically, a mold of 650 mm×1,000 mm with libs and bosses was used, and the temperatures of an upper mold (cavity) and a lower mold (core) were set at 145° C. and 135° C., respectively. Subsequently, the SMC that was cut into a predetermined size was placed on the mold, clamped with a pressure of 1 MPa, and molded by heat and pressure to produce a molded article. The resultant molded article had excellent quality. Namely, the moldability of the SMC was good.

Table 1 shows the assessment about he amounts of pentadodecenyl succinic acid and magnesium oxide, the moisture content of the molding compound composition, the viscosity of the resultant molding compound thickened, the processability, handling characteristics and moldability of the SMC (hereinafter just referred to as the assessment).

Example 2

A molding compound composition whose moisture content was adjusted to 0.38 percent was prepared by performing a reaction and mixing under the same conditions as in Example 1 except that the amount of pentadodecenyl succinic acid was changed from 1.5 parts to 4 parts, the amount of magnesium oxides was changed from 0.6 parts to 1.1 parts, and the amount of water added was adjusted.

With the use of the molding compound composition, an SMC was produced by the same method as in Example 1. The viscosity after thickening reached about 300,000 poise, and the processability in production of the SMC was good.

The SMC thus obtained allowed the polyethylene films to be easily separated from the surface thereof. It was found by touching the SMC with a hand that the surface was not sticky. Namely, the handling characteristics of the SMC were good. Further, a molded article was produced in the same manner as in Example 1. The resultant molded article had good quality. Accordingly, the moldability of the SMC was also good. Table 1 shows the assessment.

Comparative Example 1

A molding compound composition used for comparison purposes was prepared by performing a reaction and mixing under the same conditions as in Example 1 except that pentadodecenyl succinic acid was not used. In other words, a comparative molding compound composition whose moisture content was adjusted to 0.12 percent was prepared.

With the use of the comparative molding compound composition, a comparative SMC was produced by the same method as in Example 1. An initial increase in viscosity occurred at higher speeds, and therefore the flowability of the molding compound composition was lowered. Consequently, the molding compound composition was not sufficiently impregnated into the glass fibers, resulting in poor impregnation. Namely, the processability in production of the SMC was bad. Since the viscosity of the thickened molding compound composition was about 400,000 poise, the resultant SMC had good handing characteristics. However, when a molded article was produced by the molding compound composition in the same manner as in Example 1, the resultant molded article had defective appearance due to poor impregnation. Accordingly, the molded article did not have good quality. Thus, the moldability of the SMC was bad. Table 1 shows the assessment.

Comparative Example 2

A comparative molding compound composition whose moisture content was adjusted to 0.08 percent was prepared by performing a reaction and mixing under the same conditions as in Example 1 except that the amount of magnesium oxide was changed from 0.6 parts to 0.55 parts and the amount of water added was adjusted.

With the use of the comparative molding compound composition, a comparative SMC was produced by the same method as in Example 1. The viscosity of the thickened molding compound composition reached about 300,000 poise, and therefore the processability was good. However, it was difficult to separate the polyethylene films from the surface of the resultant SMC. In addition, it was found by touching the SMC with a hand that the surface was sticky. Namely, the SMC showed bad handling characteristics. On the other hand, the moldability of the SMC was good. Table 1 shows the assessment.

Comparative Example 3

A comparative molding compound composition whose moisture content was adjusted to 0.5 percent was prepared by performing a reaction and mixing under the same conditions as in Example 1 except that the amount of pentadodecenyl succinic acid was charged from 1.5 parts to 7 parts, the amount of magnesium oxide was changed from 0.6 parts to 1.5 parts, and the amount of water added was adjusted.

With the use of the comparative molding compound composition, a comparative SMC was produced by the same method as in Example 1. An initial increase in the viscosity occurred at higher speeds, and the flowability of the molding compound composition was lowered. Consequently, the molding compound composition was not sufficiently impregnated into glass fibers, resulting in poor impregnation. Namely, the processability in production of the SMC was bad. The viscosity of the thickened molding compound composition reached about 350,000 poise, and the SMC had good handling characteristics. However, when a molded article was produced in the same manner as in Example 1, the resultant molded article had defective appearance due to poor impregnation. Accordingly, the molded article did not have good quality. Thus, the moldability of the SMC was bad. Table 1 shows the assessment.

Next, the thickening behavior of the molding compound composition of the present invention was observed. Namely, changes in the viscosity of the molding compound composition with time were measured.

TABLE 1

|  | Examples | | Comparative Examples | | |
| --- | --- | --- | --- | --- | --- |
|  | 1 | 2 | 1 | 2 | 3 |
| pentadodecenyl succinic acid (part) | 1.5 | 4 | 0 | 1.5 | 7 |
| magnesium oxide (part) | 0.6 | 1.1 | 0.6 | 0.55 | 1.5 |
| moisture content (%) | 0.12 | 0.38 | 0.12 | 0.08 | 0.50 |
| viscosity after thickening ($\times 10^4$ poise) | 30 | 30 | 40 | 30 | 35 |
| processability during production | good | good | bad | good | bad |
| handling characteristics | good | good | good | bad | good |
| moldability | good | good | bad | good | bad |

Example 3

Unsaturated polyester was formed by, performing a dehydration reaction in the same manner its in Example 1 using 980 parts maleic anhydride and 836 parts propylene glycol. A resin composition A with an acid value of 14 and a viscosity of 8 poise was prepared by mixing 68 parts unsaturated polyester, 42 parts styrene and 0.02 part hydroquinone. Moreover, a resin composition B was prepared by mixing 70 parts styrene, 30 parts polystyrene and 0.02 parts hydroquinone.

Next, 85 parts resin composition A was mixed with 15 parts resin composition B, 150 parts calcium carbonate, 1 part t-butyl-peroxy benzoate, 4 parts zinc stearate, 5 parts polyethylene powder as a low profile additive (resin composition) and 6 parts pentadodecenyl succinic acid. In addition, by mixing 1.15 parts magnesium oxide and 5 parts pigment with the mixture, and by adding water to control the moisture content of a desired molding compound composition to be 0.38 percent, the molding compound composition was prepared. Namely, the molding compound composition with a moisture content of 0.38 percent was prepared.

With the use of the molding compound composition, the thickening behavior was observed. More specifically, changes in the viscosity of the molding compound composition with time were measured. The changes in the viscosity in a period of 60 minutes from the addition of thickening agent, i.e., the results of measuring of the initial viscosity, are shown in the graph of FIG. 1. Additionally, the viscosity was measured over a period of 44 hours from the preparation, and the results are shown in the graphs of FIGS. 2 and 3, and in Table 2 together with the amounts of pentadodecenyl succinic acid and magnesium oxide used for preparing the molding compound composition, and the moisture content of the molding compound composition.

Figure 2:
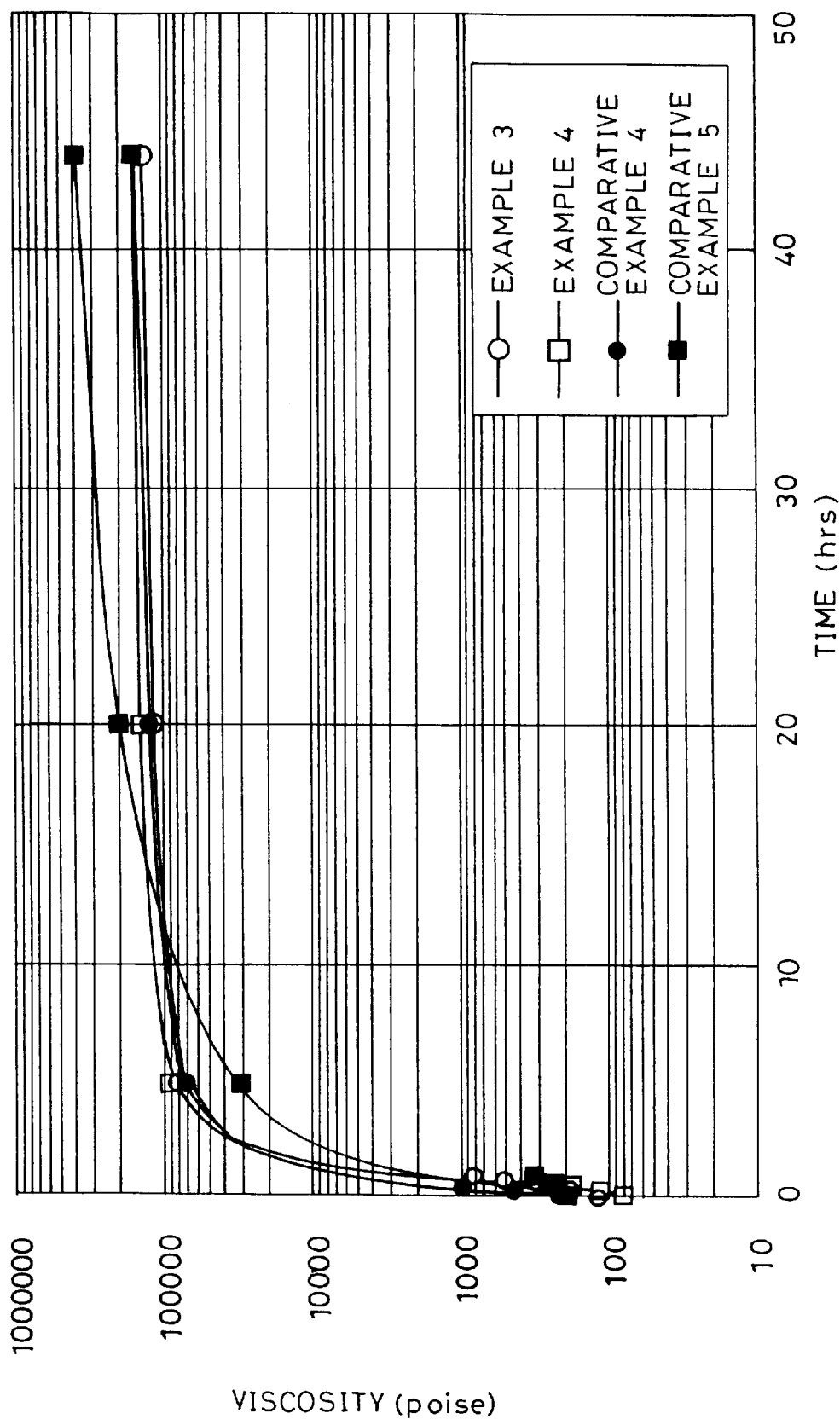
FIG. 2 is a graph (semi-log graph) showing the results of measuring the viscosity of the molding compound compositions over a period of 44 hours from the preparation of the molding compound compositions, and the comparative examples.
Figure 3:
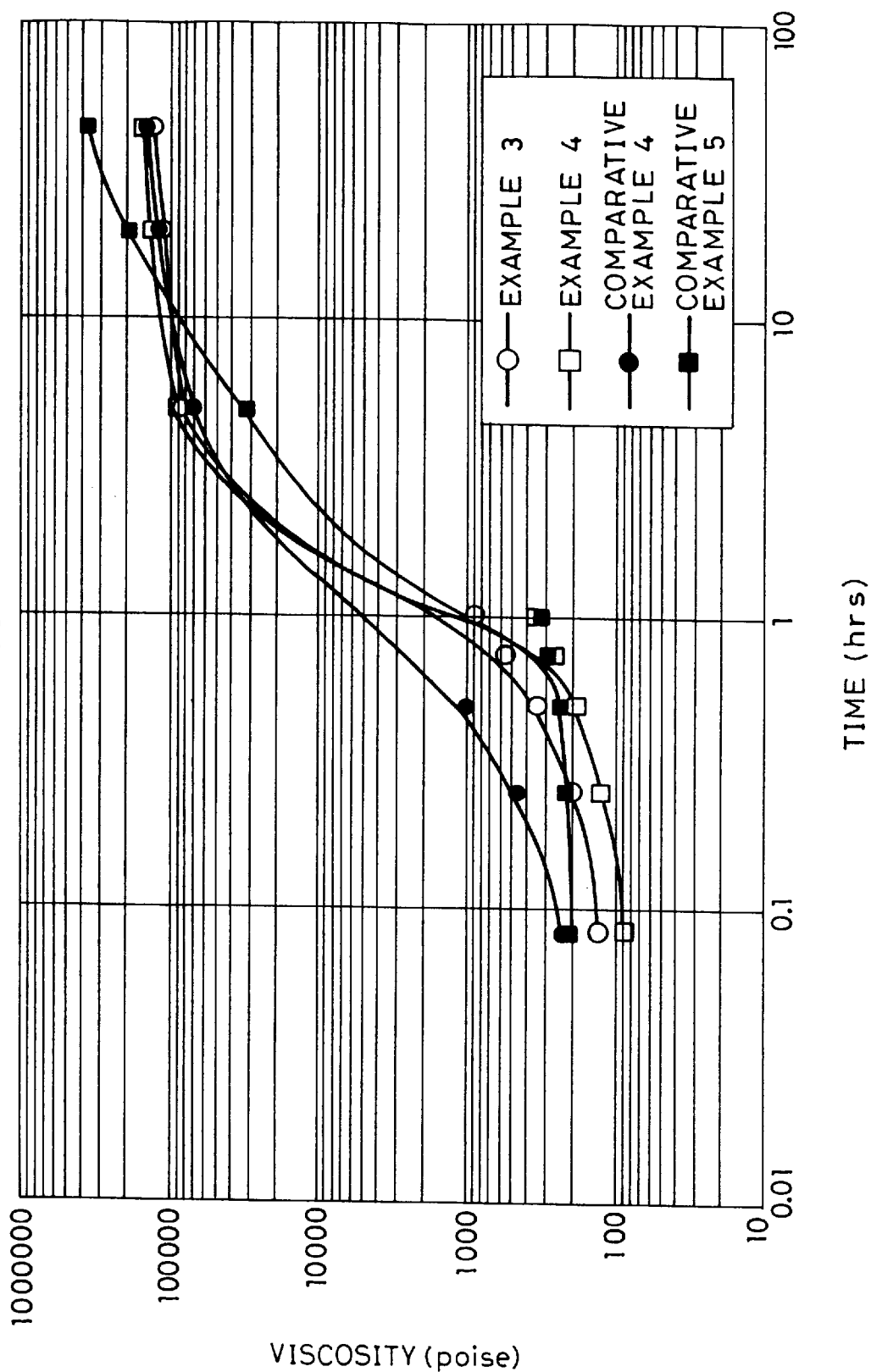
FIG. 3 is a graph (log-log graph) showing the results of measuring the viscosity of the molding compound compositions over a period of 44 hours from the addition of thickening agent, and the comparative examples.
Figure 4:
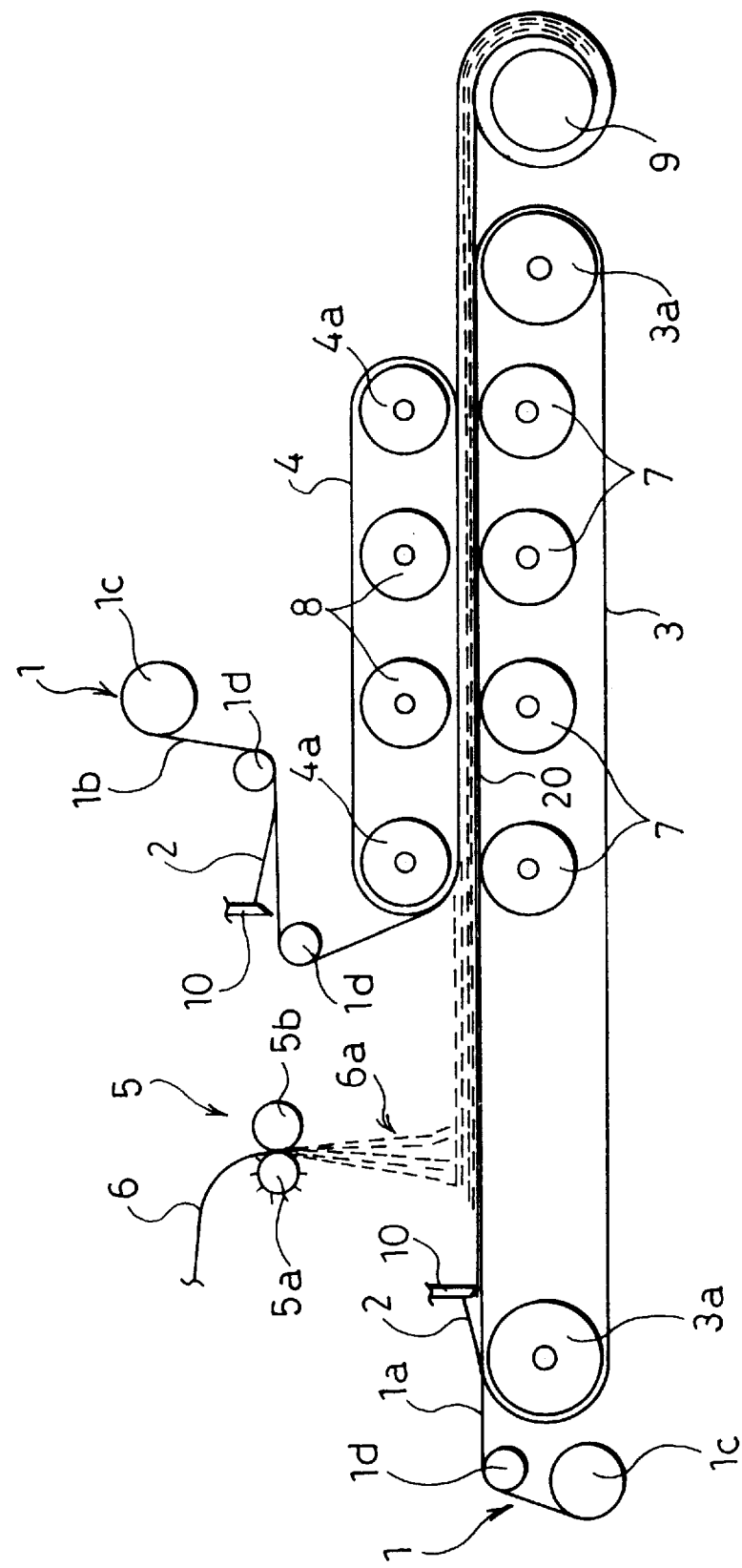
FIG. 4 is a view showing a schematic structure of a machine for producing a sheet molding compound as a molding compound of the present invention.

As is clear from the graph of FIG. 2, the initial viscosity of the molding compound composition kept low values. It was thus found that the molding compound composition has excellent impregnability into reinforcements such as glass fibers. Namely, it was found that the processability in production of the SMC is good. As is clear from the graphs of FIGS. 2 and 3, the viscosity abruptly increases several hours later from the preparation, and the molding compound composition is thickened in a shorter time as compared with a conventional composition. It was found that the viscosity after thickening reaches a suitable value as a molding compound within a period of 24 hours, and the value is kept thereafter. Moreover, it was found by touching the molding compound composition with a hand that the surface was not sticky. Accordingly, the handling characteristics of the SMC was good.

Example 4

A molding compound composition whose moisture content was adjusted to 0.14 percent was prepared by performing a reaction and mixing under the same conditions as in Example 3 except that the amount of pentadodecenyl succinic acid was changed from 6 parts to 2 parts, the amount of magnesium oxide was changed from 1.1 parts to 0.65 part, and the amount of water added was adjusted.

With the use of the molding compound composition, changes in the viscosity with time were measured in the same manner as in Example 3. The results of measuring the initial viscosity are shown in the graph of FIG. 1. Additionally, the viscosity was measured over a period of 44 hours from the preparation, and the results are shown in the graphs of FIGS. 2 and 3 and in Table 2.

As is clear from FIG. 1, the initial viscosity of the molding compound composition kept low values. Thus, it was found that the molding compound composition has excellent impregnability into reinforcements such as glass fibers. Namely, it was found that the processability in production of the SMC is good. Moreover, as is clear from the graphs of FIGS. 2 and 3, the viscosity abruptly increases several hours later from the preparation, and the molding compound composition is thickening in a shorter time as compared with a conventional composition. It was found that the viscosity after thickening reaches a suitable value as a molding compound within a period of 24 hours, and the value is kept thereafter. Furthermore, it was found by touching the molding compound composition with a hand that the surface was not sticky. Accordingly, it was found that the handling characteristics of the SMC are good.

Comparative Example 4

A comparative molding compound composition whose moisture content was adjusted to 0.14 percent was prepared by performing a reaction and mixing under the same conditions as in Example 3 except that the amount of pentadodecenyl succinic acid was changed to 0 part (i.e., pentadodecenyl succinic acid was not used), the amount of magnesium oxide was changed from 1.1 parts to 0.57 part, and the amount of water added was adjusted.

With the use of the comparative molding compound composition, changes in the viscosity with time were measured in the same manner as in Example 3. The results of measuring the initial viscosity are shown in the graph of FIG. 1. Additionally, the viscosity was measured for a period of 44 hours from the preparation, and the results are shown in the graphs of FIGS. 2 and 3 and in Table 2.

As is clear from FIG. 1, the initial viscosity of the comparative molding compound composition was increased fast, the comparative molding compound composition was not sufficiently impregnated into reinforcements such as glass fibers, resulting in poor impregnation. Namely, it was fount that the processability in production of the SMC is bad.

Comparative Example 5

A comparative molding compound composition whose moisture content was adjusted to 0.08 percent was prepared by performing a reaction and mixing under the same conditions as in Example 3 except that the amount of pentadodecenyl succinic acid was changed to 0 part, the amount of magnesium oxide was changed from 1.1 parts to 0.57 part, and the amount of water added was adjusted.

With the use of the comparative molding compound composition, changes in the viscosity with time were measured in the same manner as in Example 3. The results of measuring the initial viscosity are shown in the graph of FIG. 1. Additionally, the viscosity was measured over a period of 44 hours from the preparation, and the results are shown in the graphs of FIGS. 2 and 3, and in Table 2.

TABLE 2

|  | Examples | | Comparative Examples | |
| --- | --- | --- | --- | --- |
|  | 3 | 4 | 4 | 5 |
| pentadodecenyl succinic acid (part) | 6 | 2 | 0 | 0 |
| magnesium oxide (part) | 1.15 | 0.65 | 0.57 | 0.57 |
| moisture content (%) | 0.38 | 0.14 | 0.14 | 0.08 |
| viscosity (poise) | time elapsed (minutes) | | | |
| 5 | 126 | 83 | 220 | 195 |
| 15 | 193 | 120 | 460 | 205 |
| 30 | 329 | 179 | 1020 | 238 |
| 300 | $8.4 \times 10^4$ | $9.6 \times 10^4$ | $7.2 \times 10^4$ | $3.1 \times 10^4$ |
| 1200 | $11.7 \times 10^4$ | $14.4 \times 10^4$ | $12.6 \times 10^4$ | $19.8 \times 10^4$ |
| 2640 | $13.8 \times 10^4$ | $15.8 \times 10^4$ | $15.6 \times 10^4$ | $38.4 \times 10^4$ |

As is clear from FIG. 1, the initial viscosity of the comparative molding compound composition kept low values. Accordingly, it was found that the comparative molding compound composition has excellent impregnability into reinforcements such as glass fibers. Namely, it was found that the comparative molding compound composition has good processability in production of the SMC. However, as is (clear from the graphs of FIGS. 2 and 3, in the comparative molding compound composition, the thickening action is weak for a period several hours from the preparation, and the viscosity increases with time and is not stable even when 44 hours has elapsed since the preparation. Namely, it was found that the period of time in which the comparative molding compound composition can keep a suitable value as a molding compound is extremely short. Moreover, the surface of the comparative material composition was sticky. Accordingly, it was found that the handling characteristics and moldability of the SMC are bad.

Another comparative molding compound composition was prepared by decreasing the amount of magnesium oxide from 0.57 part of Comparative Example 5. It took a longer time for the viscosity of the resultant comparative molding compound composition to reach the suitable value as a molding compound than the above-mentioned comparative molding compound composition.

While the examples and comparative examples are presented in the section of the best mode for carrying out the invention, it is not intended that this description be constructed in a limiting sense. It will be obvious that the same may be varied in many ways. Such variations are not to be regarded as a departure from the spirit and scope of the invention, and all such modifications as would be obvious to one skilled in the art are intended to be included within the scope of the claims as set forth later.

Industrial Applicability

As described above, the molding compound composition of the present invention is composed of the resin composition, succinic acid derivative, thickening agent, and an amount of water ranging from 0.1 percent to 0.45 percent by weight. As also described above, the molding compound of the present invention is composed of the molding compound composition containing the resin composition, succinic acid derivative and thickening agent, the reinforcement, and an amount of water ranging from 0.1 percent to 0.4 percent by weight.

Since the initial thickening action due to the thickening agent is restrained, the above molding compound composition shows excellent viscosity characteristics. Additionally, although the viscosity of the thickened molding compound composition is lower than that of a conventional composition, the stickiness on the surface thereof is reduced, and the handling characteristics thereof are good. More specifically, the above molding compound composition has high flowability, and excellent impregnability into reinforced fibers. After impregnation, the molding compound composition shows an abrupt increase of viscosity, and is thickened within a shorter time as compared with the conventional composition. Thus, this molding compound composition has good processability in production of the molding compound, good handling characteristics and moldability in molding the molding compound, and provides a molding compound that is particularly suitable for low pressure molding.

The above-mentioned molding compound is particularly suitable for molding under low pressure (around 1 MPa). This molding compound can also be suitably used for molding carried out under conventional molding conditions, i.e., molding by high pressure (around 5 MPa to 15 MPa).

The above-mentioned molding compound is suitably used as materials for molded articles, for example, decorative building materials like tiles and wall panels; housing equipment including bathtubs, panels used for bathroom, kitchen counters, washbasins, and top panels for table, and other various decorative items.

The method for producing a molding compound of the present invention includes impregnating a reinforcement with a molding compound composition containing a resin composition, succinic acid derivative, thickening agent, and an amount of water ranging from 0.1 percent to 0.45 percent by weight.

Since this method can fully exhibits the above-mentioned various functions and effects, it is possible to readily produce a molding compound that has good processability, handing characteristics and moldability, and is particularly suitable for low pressure molding.

We claim:

1. A molding compound composition comprising a resin composition, a succinic acid derivative, a thickening agent, and an amount of water, the amount of water being adjusted in a range of from 0.1 percent to 0.45 percent by weight based on the total weight of the molding compound composition.

2. A molding compound comprising:

a molding compound composition comprising a resin composition, a succinic acid derivative, and a thickening agent;

a reinforcement; and an amount of water, the amount of water being adjusted in a range of from 0.1 percent to 0.4 percent by weight based on the total weight of the molding compound.

3. A method for producing a molding compound by impregnating a reinforcement with a molding compound composition comprising a resin composition, a succinic acid derivative, a thickening agent, and an amount of water, the amount of water being adjusted in a range of from 0.1 percent to 0.45 percent by weight based on the total weight of the molding compound composition.

4. The molding compound composition of claim 1, wherein the resin composition is a mixture of an unsaturated polyester and a vinyl monomer.

5. The molding compound of claim 2, wherein the resin composition is a mixture of an unsaturated polyester and a vinyl monomer.

6. The method of claim 3, wherein the resin composition is a mixture of an unsaturated polyester and a vinyl monomer.

7. The molding compound composition of claim 4, wherein the unsaturated polyester has a number average molecular weight in a range of from 1,000 to 6,000, an acid value in a range of from 9 mgKOH/g to 50 mgKOH/g and a hydroxyl value in a range of from 10 mgKOH/g to 60 mgKOH/g.

8. The molding compound of claim 5, wherein the unsaturated polyester has a number average molecular weight in a range of from 1,000 to 6,000, an acid value in a range of from 9 mgKOH/g to 50 mgKOH/g and a hydroxyl value in a range of from 10 mgKOH/g to 60 mgKOH/g.

9. The method of claim 6, wherein the unsaturated polyester has a number average molecular weight in a range of from 1,000 to 6,000, an acid value in a range of from 9 mgKOH/g to 50 mgKOH/g and a hydroxyl value in a range of from 10 mgKOH/g to 60 mgKOH/g.

* * * * *